United States Patent
Hotta et al.

(10) Patent No.: US 9,864,199 B2
(45) Date of Patent: Jan. 9, 2018

(54) MONOCULAR PROJECTION-TYPE DISPLAY

(71) Applicant: KABUSHIKI KAISHA TOSHIBA, Minato-ku, Tokyo (JP)

(72) Inventors: Aira Hotta, Kanagawa (JP); Tomoya Tsuruyama, Kanagawa (JP); Shimpei Sawada, Kanagawa (JP); Yoshiyuki Kokojima, Kanagawa (JP); Akihisa Moriya, Kanagawa (JP); Masahiro Baba, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 121 days.

(21) Appl. No.: 14/641,644

(22) Filed: Mar. 9, 2015

(65) Prior Publication Data
US 2015/0338654 A1    Nov. 26, 2015

(30) Foreign Application Priority Data

May 21, 2014    (JP) .................................. 2014-104881

(51) Int. Cl.
| | | |
|---|---|---|
| *G02B 27/01* | (2006.01) | |
| *G02B 27/10* | (2006.01) | |
| *G09G 5/00* | (2006.01) | |

(52) U.S. Cl.
CPC ........... *G02B 27/0172* (2013.01); *G09G 5/00* (2013.01); *G02B 2027/0118* (2013.01);
(Continued)

(58) Field of Classification Search
CPC ................ G02B 27/0172; G02B 5/205; G02B 2027/0178; G02B 2027/017; G02C 7/088
See application file for complete search history.

(56) References Cited

U.S. PATENT DOCUMENTS

| | | | | |
|---|---|---|---|---|
| 6,011,653 A | * | 1/2000 | Karasawa | .......... G02B 27/0172 348/E5.145 |
| 6,040,945 A | * | 3/2000 | Karasawa | .......... G02B 27/0172 348/E5.145 |

(Continued)

FOREIGN PATENT DOCUMENTS

| | | |
|---|---|---|
| EP | 08-25470 | 2/1998 |
| JP | 2002-287077 | 10/2002 |

(Continued)

OTHER PUBLICATIONS

Extended European Search Report for European Patent Application No. 15159369.6-1562 dated Oct. 26, 2015, 7 pages.

(Continued)

*Primary Examiner* — Xuemei Zheng
(74) *Attorney, Agent, or Firm* — Amin, Turocy & Watson LLP

(57) ABSTRACT

According to one embodiment, a display includes a projector, a first optical unit, and a second optical unit. The projector emits a first light including image information. The first optical unit transmits at least a portion of a second light. The second optical unit reflects at least a portion of the first light and transmits at least a portion of the second light. A light reflectance of the first optical unit is lower than a light reflectance of the second optical unit, and a light absorptance of the first optical unit is higher than a light absorptance of the second optical unit.

20 Claims, 6 Drawing Sheets

(52) U.S. Cl.
CPC ............... *G02B 2027/0143* (2013.01); *G02B 2027/0178* (2013.01); *G02B 2027/0194* (2013.01)

(56) References Cited

U.S. PATENT DOCUMENTS

| | | | |
|---|---|---|---|
| 6,236,511 B1 * | 5/2001 | Brown | G02B 3/08 359/634 |
| 7,656,585 B1 * | 2/2010 | Powell | G02B 5/09 349/11 |
| 8,503,087 B1 | 8/2013 | Amirparviz | |
| 2006/0110587 A1 * | 5/2006 | Okami | G02B 5/205 428/216 |
| 2009/0128939 A1 * | 5/2009 | Knapp | C23C 14/025 359/888 |
| 2010/0110368 A1 * | 5/2010 | Chaum | G02B 27/017 351/158 |
| 2013/0077175 A1 | 3/2013 | Hotta et al. | |
| 2013/0100511 A1 * | 4/2013 | Yamamoto | G02B 27/017 359/9 |

FOREIGN PATENT DOCUMENTS

| | | |
|---|---|---|
| JP | 2013-073070 | 4/2013 |
| WO | 2012-176201 | 12/2012 |

OTHER PUBLICATIONS

Japanese Office Action for Japanese Patent Application No. 2014-104881 dated Dec. 22, 2015.

* cited by examiner

MONOCULAR PROJECTION-TYPE DISPLAY

CROSS-REFERENCE TO RELATED APPLICATIONS

This application is based upon and claims the benefit of priority from Japanese Patent Application No. 2014-104881, filed on May 21, 2014; the entire contents of which are incorporated herein by reference.

FIELD

Embodiments described herein relate generally to a display.

BACKGROUND

There is a display that projects an image displayed by a display unit toward a viewer by using a reflector to reflect the image. For example, such a display device is used as a head mounted display (HMD). An easily-viewable display is desirable in such a display.

DETAILED DESCRIPTION

Figure 1:
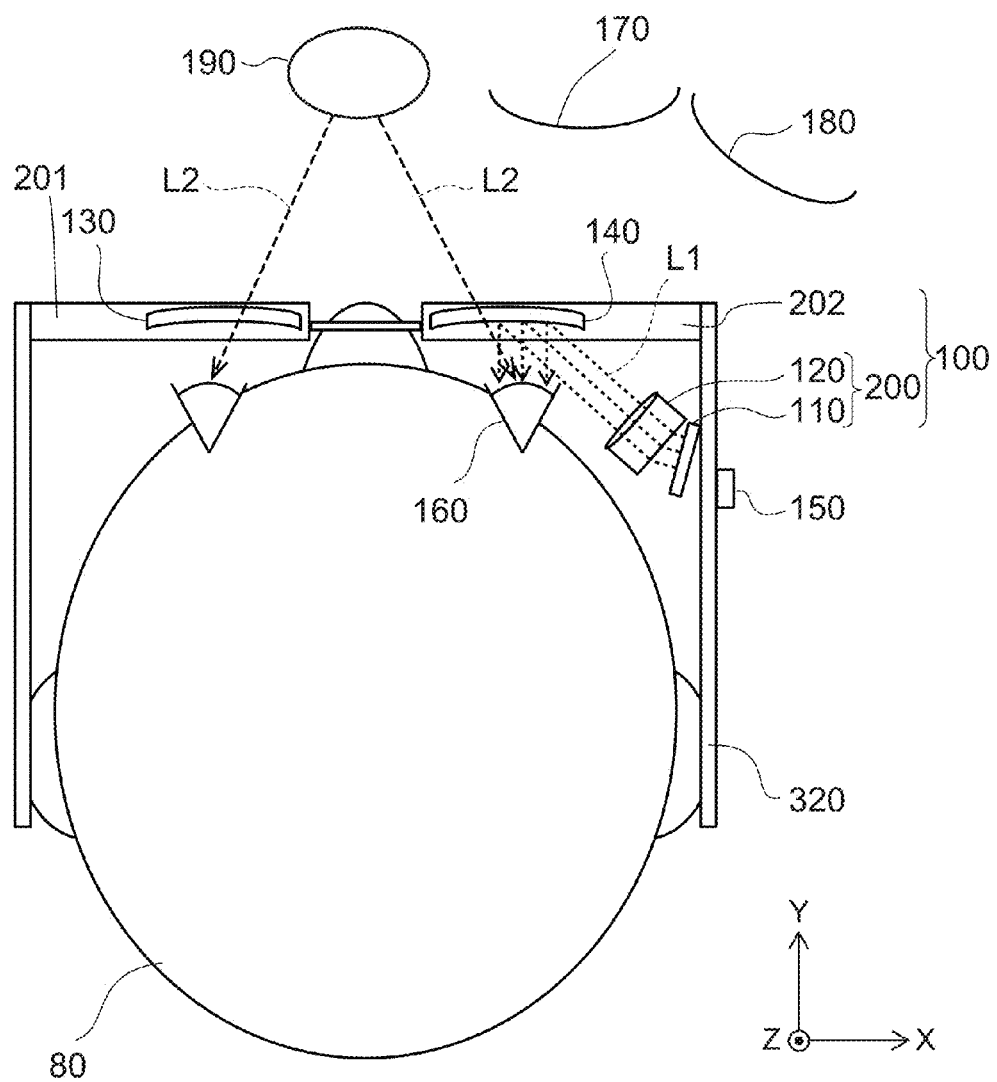
FIG. 1 is a schematic view illustrating a display according to a first embodiment.

According to one embodiment, a display includes a projector, a first optical unit, and a second optical unit. The projector emits a first light including image information. The first optical unit transmits at least a portion of a second light. The second optical unit reflects at least a portion of the first light and transmits at least a portion of the second light. A light reflectance of the first optical unit is lower than a light reflectance of the second optical unit, and a light absorptance of the first optical unit is higher than a light absorptance of the second optical unit.

Various embodiments will be described hereinafter with reference to the accompanying drawings.

The drawings are schematic or conceptual; and the relationships between the thicknesses and widths of portions, the proportions of, sizes between portions, etc., are not necessarily the same as the actual values thereof. Further, the dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

FIG. 1 is a schematic view illustrating a display according to a first embodiment.

As shown in FIG. 1, the display 100 includes a projector 200, a first optical unit 130, a second optical unit 140, and a processing unit 150. The projector 200 includes a display device 110 and an optical device 120. The direction in which the first optical unit 130 and the second optical unit 140 are arranged is taken as an X-axis direction. One direction perpendicular to the X-axis direction is taken as a Y-axis direction. A direction perpendicular to the X-axis direction and perpendicular to the Y-axis direction is taken as a Z-axis direction. For example, the Y-axis direction corresponds to the frontward direction of a viewer 80 and corresponds to the direction in which a holder 320 extends. The X-axis direction corresponds to the left and right direction (the horizontal direction) of the viewer 80; and the Z-axis direction corresponds to the upward direction (the vertical direction) of the viewer 80.

For example, image information is input from the processing unit 150 to the display device 110.

The display device 110 includes multiple pixels. The multiple pixels are provided to be arranged on a plane. The display device 110 emits an image light (a first light) L1 that includes the image information. The display device 110 is a display that displays an image. The image light L1 is emitted toward the optical device 120. The display includes, for example, a liquid crystal, organic EL, LCOS (Liquid Crystal On Silicon), etc. However, the embodiment is not limited thereto.

The optical device 120 is provided between the display device 110 and the second optical unit 140 in the optical path of the image light L1 emitted from the multiple pixels of the display device 110. The optical device 120 includes at least one optical element. The optical device 120 projects the image light L1 that is incident. The optical element may include a lens, a prism, a mirror, etc. For example, the optical device 120 changes the travel direction of at least a portion of the image light L1. In the case where multiple optical elements are used, the multiple optical elements may not be disposed in a straight line. Although the display device 110 and the optical device 120 are disposed to be tilted in FIG. 1, the disposition not limited to this example.

The second optical unit 140 is, for example, a multimirror array (MMA). The MMA is a flat-plate combiner in which a half mirror coating that reflects a portion of the light is provided on a surface of micro prisms having a configuration in which the cross section of the trenches are formed in a sawtooth configuration so that the reflection direction of the light that is incident is reflected in a prescribed direction.

The second optical unit 140 reflects at least a portion of the image light L1 passing through the optical device 120. For example, the second optical unit 140 reflects the light passing through the optical device 120 toward a pupil 160 of the viewer 80. When viewed from the pupil 160, the light reflected by the second optical unit 140 forms an image as a virtual image. Thus, the viewer 80 can view the image.

In the example, the image is displayed as a virtual image. In the example, the image 170 is displayed at the front of the pupil 160. However, the image may be displayed as an image such as an image 180 at the edge of the visual field of the viewer 80. Thereby, the visual field of the viewer 80 is not obstructed. The image 170 or the image 180 is superimposed onto a foreground 190 which is the actual view. The viewer 80 can view the foreground 190 on which the image 170 or the image 180 is superimposed.

In the example, the display device 100 further includes the holder 320. The holder 320 holds at least one of the display device 110, the optical device 120, the first optical unit 130, or the second optical unit 140. The holder 320 includes a first frame 201 for holding the first optical unit 130 and a second frame 202 for holding the second optical unit 140. For example, the holder 320 is made of a resin and/or a metal. For example, the holder 320 regulates the relative arrangement of the second optical unit 140 and the optical device 120 and the relative arrangement of the optical device 120 and the display device 110. An example is described in the embodiment in which the configuration of the holder 320 is that of an eyeglasses frame. The holder 320 may have a goggle configuration, etc. It is favorable for the projector 200 that includes the display device 110 and the optical device 120 to be disposed on the inner side of the holder 320 when the viewer 80 wears the holder 320. Thereby, the viewer 80 can use the display 100 as normal eyeglasses without discomfort.

FIG. 1 shows a monocular HMD that uses one display 100 and displays the image to one eye. The display 100 is provided for the right eye but may be provided for the left eye.

The HMD described above may be a binocular projection-type or a monocular projection-type. For example, the configuration of the HMD may be an eyeglasses configuration, a goggle configuration, etc. In the case of the binocular projection-type, for example, multimirror arrays (MMAs) are mounted on the frame portions of both eyes. In the case of the monocular projection-type, the MMA may be mounted only on the frame portion on the projection side. In such a case, a difference occurs between the transmittances of the frame portion on the projection side and the frame portion on the non-projection side; and the visibility decreases. Therefore, an easily-viewable display is desirable.

In the embodiment as shown in FIG. 1, the first optical unit 130 is provided on the non-projection side as a pair with the second optical unit 140 on the projection side. The projector 200 emits the image light L1 toward the second optical unit 140. The first optical unit 130 transmits at least a portion of a foreground light (a second light) L2 from the foreground 190. The second optical unit 140 reflects at least a portion of the image light L1 and transmits at least a portion of the foreground light L2.

The light reflectance of the first optical unit 130 is lower than the light reflectance of the second optical unit 140. The light absorptance of the first optical unit 130 is higher than the light absorptance of the second optical unit 140. Thereby, the light transmittance of the first optical unit 130 and the light transmittance of the second optical unit 140 are set to be substantially the same; and the decrease of the visibility is suppressed.

In other words, the second optical unit 140 includes a light reflecting layer (referring to FIG. 3A to FIG. 3C described below) that reflects at least a portion of the image light L1 from the projector 200. Therefore, compared to the first optical unit 130, the second optical unit 140 has a greater reflection component for the foreground light L2 from the foreground 190; and the light transmittance is attenuated. On the other hand, compared to the second optical unit 140, the absorption component of the first optical unit 130 for the foreground light L2 from the foreground 190 is set to be greater. Thereby, the light transmittance is attenuated. Specifically, the structures shown in FIG. 2A to FIG. 2D described below may be considered. Thereby, the light transmittance of the first optical unit 130 and the light transmittance of the second optical unit 140 are set to be substantially the same; and an easily-viewable display can be provided.

In the embodiments recited below, the light reflectance, the light absorptance, and the light transmittance may be the spectral reflectance, the spectral absorptance, and the spectral transmittance, respectively. The light reflectance is, for example, the specular reflectance. The light reflectance, the light absorptance, and the light transmittance satisfy the following relationship.

$$\text{light reflectance} + \text{light absorptance} + \text{light transmittance} = 1 \quad (1)$$

The method for measuring the light reflectance may include, for example, using a photometric sphere and measuring the intensity of the reflected light for the light that is incident by a spectrophotometer. The method for measuring the light transmittance may similarly include using a photometric sphere and determining the transmitted light for the light that is incident by a spectrophotometer. The light absorptance is determined using Formula (1) recited above from the value of the light transmittance and the value of the light reflectance measured by the spectrophotometer.

FIG. 2A to FIG. 2D are schematic cross-sectional views illustrating the first optical units of displays according to embodiments.

Figure 2A:
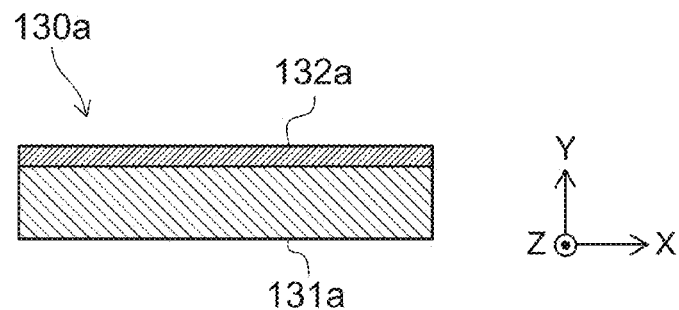
FIG. 2A to FIG. 2D are schematic cross-sectional views illustrating the first optical units of displays according to embodiments.
Figure 2B:
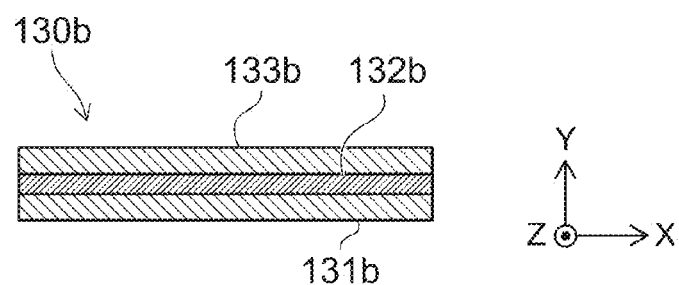
Figure 2C:
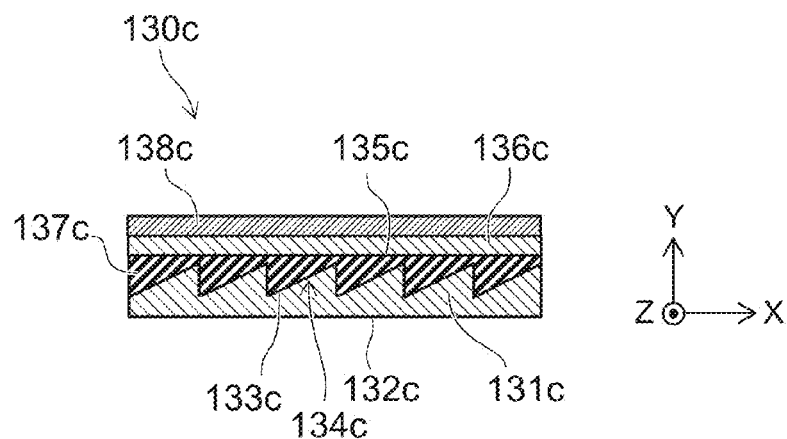
Figure 2D:
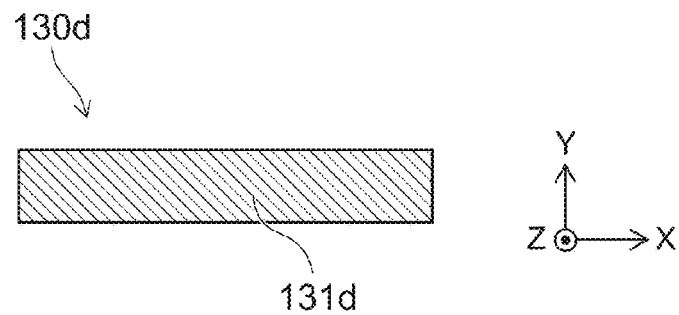

FIG. 2A shows the first optical unit according to a first embodiment; FIG. 2B shows the first optical unit according to a second embodiment; FIG. 2C shows the first optical unit according to the third embodiment; and FIG. 2D shows the first optical unit according to a fourth embodiment.

A first optical unit 130a of FIG. 2A includes a first base member 131a that is light-transmissive, and a light absorption layer 132a that is stacked with the first base member 131a.

For example, it is favorable for the material of the first base member 131a to be the same as the material of second base members 141a, 141b, and 141c (hereinbelow, representatively called the second base member 141) of the second optical unit 140 shown in FIG. 3A to FIG. 3C described below. More favorably, the refractive index of the first base member 131a is set to be substantially the same as the refractive index of the second base member 141.

The light absorption layer 132a absorbs at least a portion of the foreground light L2 (FIG. 1) and attenuates the light transmittance. The light absorptance of the light absorption layer 132a is higher than the light absorptance of the first base member 131a. The first base member 131a and the light absorption layer 132a are bonded to each other by a not-shown optical bonding agent. It is favorable for the refractive index of the optical bonding agent to be substantially the same as the refractive index of the first base member 131a.

For example, a material similar to a transparent plastic such as an acrylic material, a carbonate material, a urethane material, an epoxy material, or the like is used as the first base member 131a. For example, carbon fine particles, an organic dye, or the like is used as the light absorption layer 132a.

Second Embodiment

A first optical unit 130b of FIG. 2B includes a light-transmissive first base member 131b, a light absorption layer 132b, and a first opposing member 133b that are stacked with each other. The light absorption layer 132b is provided between the first base member 131b and the first opposing member 133b. For example, it is favorable for the material of the first base member 131b to be the same as the material of the second base member 141. More favorably, the refractive index of the first base member 131b is set to be substantially the same as the refractive index of the second base member 141. For example, it is favorable for the material of the first opposing member 133b to be the same as the material of the first base member 131b. More favorably, for example, the refractive index of the first opposing member 133b is set to be substantially the same as the refractive index of the first base member 131b.

The light absorption layer 132b absorbs at least a portion of the foreground light L2 (FIG. 1) and attenuates the light transmittance. The light absorptance of the light absorption layer 132b is higher than the light absorptance of the first base member 131b. The light absorptance of the light absorption layer 132b is higher than the light absorptance of the first opposing member 133b. The first base member 131b and the light absorption layer 132b are bonded by a not-shown optical bonding agent. Similarly, the first opposing member 133b and the light absorption layer 132b are bonded by an optical bonding agent. It is favorable for the refractive index of the optical bonding agent to be set to be substantially the same as the refractive indexes of the first base member 131b and the first opposing member 133b.

For example, a material similar to a transparent plastic such as an acrylic material, a carbonate material, a urethane material, an epoxy material, or the like is used as the first base member 131b. For example, carbon fine particles, an organic dye, or the like is used as the light absorption layer 132b. Similarly to the first base member 131b, for example, a material similar to a transparent plastic such as an acrylic material, a carbonate material, a urethane material, an epoxy material, or the like is used as the first opposing member 133b.

Third Embodiment

A first optical unit 130c of FIG. 2C includes a light-transmissive first base member 131c, a light absorption layer 138c, a first opposing member 136c, and a first optical bonding layer 137c (a first bonding layer), i.e., an intermediate layer, that are stacked with each other. The first base member 131c includes an uneven portion 134c that has multiple tilted surfaces 133c tilted with respect to a major surface 132c of the first base member 131c. The first opposing member 136c includes a planar portion 135c that opposes the uneven portion 134c. The first optical bonding layer 137c is provided between the uneven portion 134c and the planar portion 135c to bond the uneven portion 134c and the planar portion 135c. That is, the first opposing member 136c and the first optical bonding layer 137c are provided between the light absorption layer 138c and the first base member 131c.

For example, it is favorable for the material of the first base member 131c to be the same as the material of the second base member 141. More favorably, the refractive index of the first base member 131c is set to be substantially the same as the refractive index of the second base member 141. For example, it is favorable for the material of the first opposing member 136c to be the same as the material of the first base member 131c. More favorably, for example, the refractive index of the first opposing member 136c is set to be substantially the same as the refractive index of the first base member 131c. It is favorable for the refractive index of the first optical bonding layer 137c to be substantially the same as the refractive indexes of the first base member 131c and the first opposing member 136c. For example, the absolute value of the difference between the refractive index of the first optical bonding layer 137c and the refractive index of the first base member 131c is not more than 1% (more favorably, not more than 0.5%) of the refractive index of the first base member 131c.

The light absorption layer 138c absorbs at least a portion of the foreground light L2 (FIG. 1) and attenuates the light transmittance. The light absorptance of the light absorption layer 138c is higher than the light absorptance of the first base member 131c. The light absorptance of the light absorption layer 138c is higher than the light absorptance of the first opposing member 136c. The first opposing member 136c and the light absorption layer 138c are bonded by a not-shown optical bonding agent. It is favorable for the refractive index of the optical bonding agent to be substantially the same as the refractive indexes of the first base member 131c and the first opposing member 136c.

For example, a material similar to a transparent plastic such as an acrylic material, a carbonate material, a urethane material, an epoxy material, or the like is used as the first base member 131c. For example, carbon fine particles, an organic dye, or the like is used as the light absorption layer 138c. Similarly to the first base member 131c, for example, a material similar to a transparent plastic such as an acrylic material, a carbonate material, a urethane material, an epoxy material, or the like is used as the first opposing member 136c. For example, a transparent optical bonding agent such as an acrylic bonding agent, an epoxy bonding agent, a urethane bonding agent, or the like is used as the first optical bonding layer 137c.

Fourth Embodiment

A first optical unit 130d of FIG. 2D includes a first base member 131d that is light-transmissive. The light transmittance of the first base member 131d is lower than the light transmittance of the second base member 141. In other words, the first base member 131d attenuates the light transmittance by the base member itself without using a light absorption layer. For example, vinyl chloride, propylene, polyethylene, or the like is used as the first base member 131d.

According to the embodiments recited above, the light transmittance of the first optical unit 130 and the light transmittance of the second optical unit 140 can be set to be substantially the same. For example, the absolute value of the difference between the light transmittance of the first optical unit 130 and the light transmittance of the second optical unit 140 is not more than 1% (more favorably, not more than 0.5%) of the light transmittance of the second optical unit 140. Thereby, the decrease of the visibility is suppressed; and an easily-viewable display can be provided.

Figure 3A:
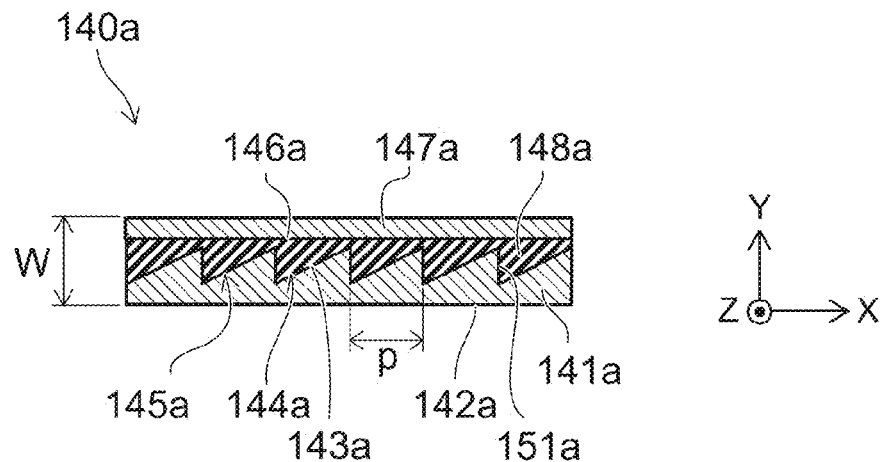
FIG. 3A to FIG. 3C are schematic cross-sectional views illustrating the second optical units of the display according to the embodiment.
Figure 3B:
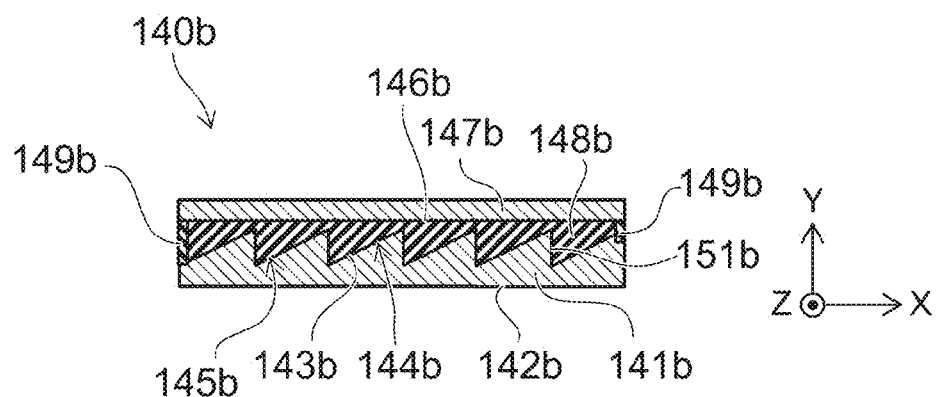
Figure 3C:
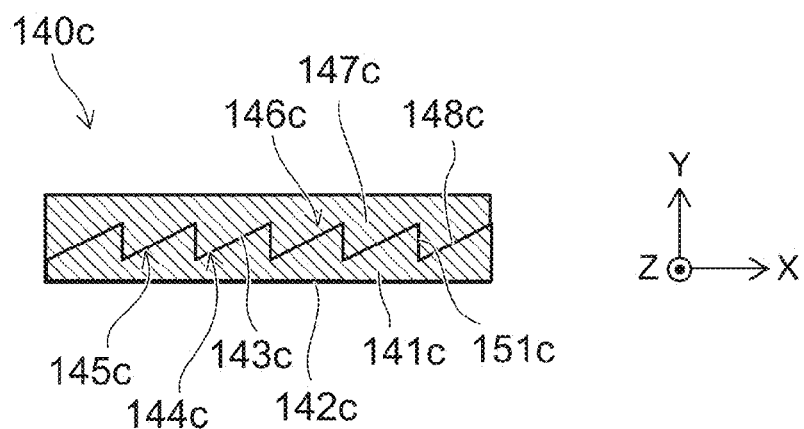

FIG. 3A to FIG. 3C are schematic cross-sectional views illustrating the second optical units of the display according to the embodiment.

A second optical unit 140a shown in FIG. 3A includes the second base member 141a that is light-transmissive, and a light reflecting layer 145a that is stacked with the second base member 141a and reflects at least a portion of the image light L1 (FIG. 1). The light reflectance of the light reflecting layer 145a is higher than the light reflectance of the second base member 141a.

The second optical unit 140a further includes a second opposing member 147a, and a second optical bonding layer 148a (a second bonding layer) which is an intermediate layer. The second base member 141a includes an uneven portion 144a that has multiple tilted surfaces 143a tilted with respect to a major surface 142a of the second base member 141a. The second opposing member 147a includes a planar portion (a plane) 146a that opposes the uneven portion 144a. The second optical bonding layer 148a is provided between the uneven portion 144a and the planar portion 146a to bond the uneven portion 144a and the planar portion 146a.

For example, it is favorable for the material of the second base member 141a to be the same as the material of the first base members 131a, 131b, and 131c (hereinbelow, representatively called the first base member 131) of the first optical unit 130 shown in FIG. 2A to FIG. 2C described above. More favorably, the refractive index of the second base member 141a is set to be substantially the same as the refractive index of the first base member 131. For example, it is favorable for the material of the second opposing member 147a to be the same as the material of the second base member 141a. More favorably, for example, the refractive index of the second opposing member 147a is set to be substantially the same as the refractive index of the second base member 141a. It is favorable for the refractive index of the second optical bonding layer 148a to be substantially the same as the refractive indexes of the second base member 141a and the second opposing member 147a. For example, the absolute value of the difference between the refractive index of the second optical bonding layer 148a and the refractive index of the second base member 141a is not more than 1% (more favorably, not more than 0.5%) of the refractive index of the second base member 141a.

For example, a material similar to a transparent plastic such as an acrylic material, a carbonate material, a urethane material, an epoxy material, or the like is used as the second base member 141a. For example, a dielectric multilayer film, a metal film, a metal oxide film, or the like is used as the light reflecting layer 145a. Similarly to the second base member 141a, for example, a material similar to a transparent plastic such as an acrylic material, a carbonate material, a urethane material, an epoxy material, or the like is used as the second opposing member 147a. For example, acrylic, epoxy, urethane, or the like is used as the second optical bonding layer 148a.

The light reflecting layer 145a is formed along the multiple tilted surfaces 143a. For example, the light reflecting layer 145a is multiple fine half mirrors disposed in parallel. That is, the light reflecting layer 145a may be half mirrors tilted with respect to the major surface 142a of the second base member 141a. Thereby, the reflection angle of the light can be adjusted. For example, the second optical unit 140a has a Fresnel structure.

Although an example is illustrated in which the major surface 142a is flat, the major surface 142a may be a curved surface. The angle of the tilted surfaces 143a is determined by the positional relationship between the optical axis of the light projected by the optical device 120 and the assumed viewpoint. Although an example is illustrated in which the tilted surfaces 143a are flat, the tilted surfaces 143a may be curved surfaces having power.

Jump surfaces 151a are surfaces that provide the Fresnel configuration for containing the tilted surfaces 143a within the prescribed thickness of the second optical unit 140a. The light reflecting layer 145a is formed on at least a portion of the tilted surfaces 143a and reflects a portion of the light that is incident. The light reflecting layer 145a is formed along the multiple tilted surfaces 143a. The jump surfaces 151a and the tilted surfaces 143a extend in the same direction.

An example is described in the embodiment in which the light reflecting layer 145a is formed on the entire surface (including the tilted surfaces 143a and the jump surfaces 151a) of the uneven portion 144a of the second optical unit 140a.

A configuration may be used in which the light reflecting layer 145a is formed on the tilted surfaces 143a without forming the light reflecting layer 145a on the jump surfaces 151a. The jump surfaces 151a are provided to form the second base member 141a to have not more than the prescribed thickness while providing the tilted surfaces 143a to form the light reflecting layer 145a having a designated angle with respect to the light incident from the optical device 120. Therefore, there are cases where light unevenness occurs in the virtual image due to the jump surfaces 151a reflecting the light emitted by the optical device 120. Therefore, the unevenness of the light can be reduced by not forming the light reflecting layer 145a on the jump surfaces 151a. Methods for forming the light reflecting layer 145a selectively may include, for example, utilizing a mask or using lithography by a laser.

The thickness (W) of the second optical unit 140a is about 2 to 3 mm. The pitch (p) in the X-axis direction of the tilted surfaces 143a is about several hundred μm. The angle between the tilted surfaces 143a and the major surface 142a is about 10 to 20°. These numerical values are examples; and other configurations are possible.

It is favorable for the second optical unit 140a to be disposed on the second frame 202 so that the major surface 142a of the second base member 141a is on the viewer 80 side. If the major surface 142a is disposed to be on the foreground 190 side, it is necessary for the light that is incident from the projector 200 to pass through the interface between the second optical bonding layer 148a and the second opposing member 147a twice, that is, before and after being reflected by the light reflecting layer 145a on the tilted surface 143a. It is difficult to set the refractive indexes of the second optical bonding layer 148a and the second opposing member 147a to be exactly the same. Therefore, a micro amount of the light is refracted at the interface; and there is a possibility of a double image or distortion of the images 170 and 180. It is possible to view good images 170 and 180 by disposing the major surface 142a to be on the viewer 80 side. It is possible to view the images 170 and 180 even in the case where the major surface 142a of the second base member 141a is disposed to be on the foreground 190 side.

It is desirable for the angle between the jump surfaces 151a and the major surface 142a or the planar portion (the plane) 146a to be substantially perpendicular. More specifically, for example, it is desirable to be about 90°±3°. Although the difference between the refractive index of the second optical bonding layer 148a and the refractive index of the second base member 141a is sufficiently small, it is difficult to set the refractive index of the second optical bonding layer 148a and the refractive index of the second base member 141a to be exactly the same. By setting the angle of the jump surfaces 151a to have the configuration recited above, the amount of the foreground light L2 incident from the foreground 190 and passing through the jump surfaces 151a can be reduced; and the double image can be suppressed.

The light reflecting layer 145a is obtained in the manufacturing process of the first optical unit 140a by, for example, forming the uneven portion 144a having the tilted surfaces 143a on the second base member 141a by pressing, etc., and by vapor-depositing a reflective coating along the tilted surfaces 143a.

Figure 4:
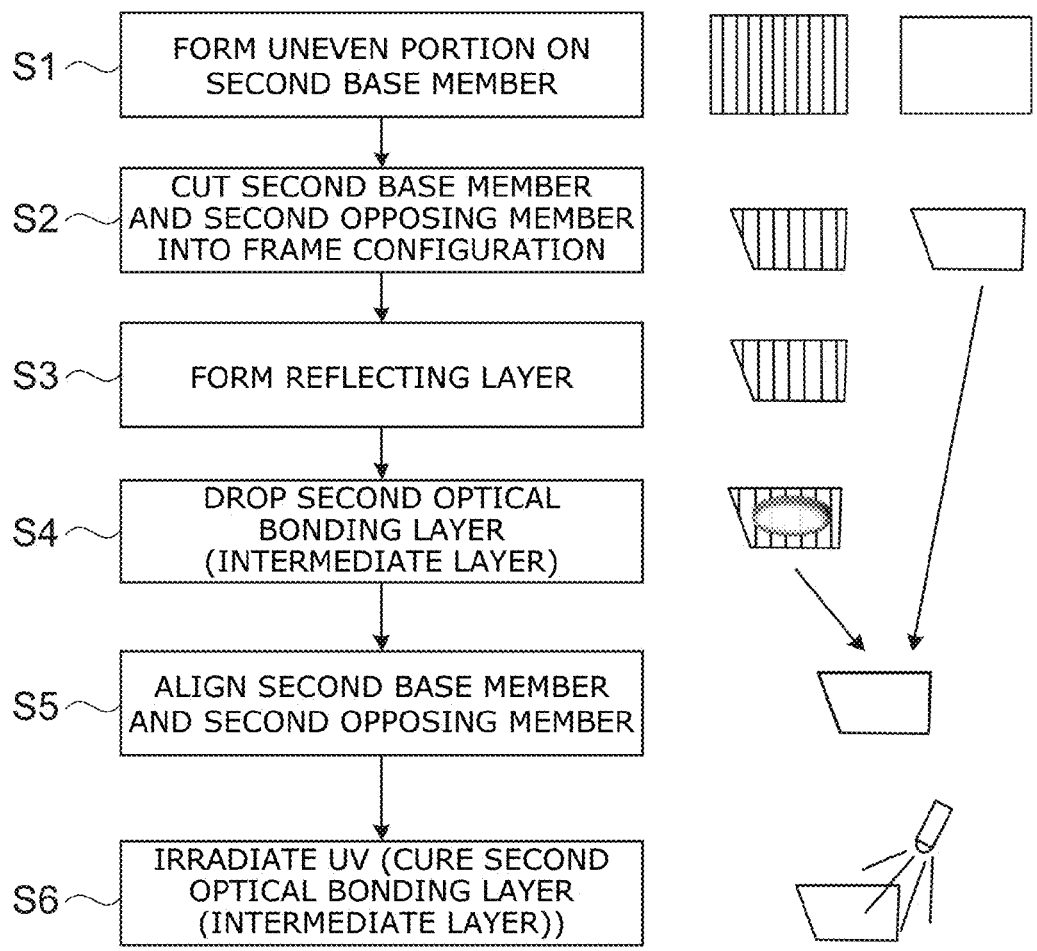
FIG. 4 is a flowchart illustrating a method for manufacturing the second optical unit according to the embodiment.

FIG. 4 is a flowchart illustrating a method for manufacturing the second optical unit according to the embodiment.

FIG. 4 shows the method for manufacturing the second optical unit 140a shown in FIG. 3A.

The uneven portion 144a is formed on the second base member 141a (step S1). For example, injection molding is used in the case where a thermoplastic resin is used as the material of the second base member 141a. The formation is performed by heating a material to its softening temperature and injecting the material into the mold by applying injection pressure. The uneven portion 144a can be formed on the second base member 141a by using a mold having an unevenness on the surface. The formation is not limited to injection molding; and pressing, etc., may be used.

The second base member 141a in which the uneven portion 144a is formed is cut to match the configuration of the second frame 202. Also, the second opposing member 147a is cut to match the configuration of the second frame 202 (step S2).

The light reflecting layer 145a is formed on the uneven portion 144a of the second base member 141a (step S3). For example, a method such as plating, vapor deposition, or the like is used to form the light reflecting layer 145a. It is possible to adjust the proportion of the reflected light and the transmitted light using the thickness of the light reflecting layer 145a. The proportion of the transmitted light increases when the light reflecting layer 145a is thin; and the proportion of the reflected light increases when the light reflecting layer 145a is thick. Instead of being formed on the entire surface of the uneven portion 144a, the light reflecting layer 145a may be formed on a portion of the uneven portion 144a.

A resin in the liquid form that is used to form the second optical bonding layer (the intermediate layer) 148a is dropped on the uneven portion side of the second base member 141a (step S4). For example, a synthetic resin that chemically changes from a liquid to a solid by reacting due to the light energy of ultraviolet (UV) is used as the resin of the second optical bonding layer 148a.

The second opposing member 147a is overlaid on the second base member 141a to hold the second optical bonding layer 148a from two sides (step S5). It is favorable for the material to be used as the second optical bonding layer 148a to have a refractive index having a small error between the refractive indexes of the second base member 141a and the second opposing member 147a. Thereby, it is possible to view the foreground 190 without distortion.

Ultraviolet (UV) is irradiated to cure the second optical bonding layer 148a (step S6). It is possible to manufacture the second optical unit 140 by the processes recited above. The first optical unit 130c shown in FIG. 2C, etc., can be manufactured by similar methods.

The methods recited above are examples; the order of steps may be interchanged; and other methods may be used.

A second optical unit 140b shown in FIG. 3B includes the second base member 141b that is light-transmissive, and a light reflecting layer 145b that is stacked with the second base member 141b and reflects at least a portion of the image light L1 (FIG. 1). The light reflectance of the light reflecting layer 145b is higher than the light reflectance of the second base member 141b.

The second optical unit 140b further includes a second opposing member 147b, an optical fluid layer 148b (a liquid layer) that is an intermediate layer, and an outer circumference bonding unit 149b. The second base member 141b includes an uneven portion 144b having multiple tilted surfaces 143b tilted with respect to a major surface 142b of the second base member 141b. Jump surfaces 151b are formed in the uneven portion 144b. The second opposing member 147b includes a planar portion 146b that opposes the uneven portion 144b. The optical fluid layer 148b is provided between the uneven portion 144b and the planar portion 146b. The outer circumference bonding unit 149b bonds the outer circumferential portion of the second base member 141b to the outer circumferential portion of the second opposing member 147b.

For example, it is favorable for the material of the second base member 141b to be the same as the material of the first base member 131. More favorably, the refractive index of the second base member 141b is set to be substantially the same as the refractive index of the first base member 131. For example, it is favorable for the material of the second opposing member 147b to be the same as the material of the second base member 141b. More favorably, for example, the refractive index of the second opposing member 147b is set to be substantially the same as the refractive index of the second base member 141b. It is favorable for the refractive index of the optical fluid layer 148b to be substantially the same as the refractive indexes of the second base member 141b and the second opposing member 147b. For example, the absolute value of the difference between the refractive index of the optical fluid layer 148b and the refractive index of the second base member 141b is not more than 1% (more favorably, not more than 0.5%) of the refractive index of the second base member 141b. It is favorable for the refractive index of the outer circumference bonding unit 149b to be substantially the same as the refractive indexes of the second base member 141b and the second opposing member 147b. For example, the absolute value of the difference between the refractive index of the outer circumference bonding unit 149b and the refractive index of the second base member 141b is set to be not more than 1% (more favorably, not more than 0.5%) of the refractive index of the second base member 141b.

In the case where the outer circumference bonding unit 149b is used (that is, the bonding unit is disposed at the outer circumferential portion), the outer circumference bonding unit 149b may not be transparent because the effects on the vision are low. For example, a method similar to the method for injecting a liquid crystal layer between the substrates of a liquid crystal panel can be used to manufacture the second optical unit 140b of FIG. 3B. Specifically, it is possible to manufacture by a method in which the outer circumference bonding unit 149b which is the bonding agent is formed at the outer circumferential portion; holes are made in portions of the outer circumference bonding unit 149b; and the optical fluid layer 148b in a liquid form is injected in a vacuum state.

For example, a material similar to a transparent plastic such as an acrylic material, a carbonate material, a urethane material, an epoxy material, or the like is used as the second base member 141b. For example, a dielectric multilayer film, a metal film, a metal oxide film, or the like is used as the light reflecting layer 145b. Similarly to the second base member 141b, for example, a material similar to a transparent plastic such as an acrylic material, a carbonate material, a urethane material, an epoxy material, or the like is used as the second opposing member 147b. As the optical fluid layer 148b, for example, a paraffin oil, a polybutene mixture, or the like is used as an optical matching oil. For example, an epoxy resin, an acrylic resin, or the like is used as the outer circumference bonding unit 149b.

The light reflecting layer 145b is formed along the multiple tilted surfaces 143b. For example, the light reflecting layer 145b is multiple fine half mirrors disposed in parallel.

A second optical unit 140c shown in FIG. 3C includes the second base member 141c that is light-transmissive, and a light reflecting layer 145c that is stacked with the second base member 141c and reflects at least a portion of the image light L1 (FIG. 1). The light reflectance of the light reflecting layer 145c is higher than the light reflectance of the second base member 141c.

The second optical unit 140c further includes a second opposing member 147c and a second optical bonding layer 148c which is an intermediate layer. The second base member 141c includes an uneven portion 144c having multiple tilted surfaces 143c tilted with respect to a major surface 142c of the second base member 141c. Jump surfaces 151c are formed in the uneven portion 144c. The second opposing member 147c includes an opposing unevenness unit 146c that engages the uneven portion 144c. The second optical bonding layer 148c is provided between the uneven portion 144c and the opposing unevenness unit 146c to bond the uneven portion 144c and the opposing unevenness unit 146c.

For example, it is favorable for the material of the second base member 141c to be the same as the material of the first base member 131. More favorably, the refractive index of the second base member 141c is set to be substantially the same as the refractive index of the first base member 131. For example, it is favorable for the material of the second opposing member 147c to be the same as the material of the second base member 141c. More favorably, for example, the refractive index of the second opposing member 147c is set to be substantially the same as the refractive index of the second base member 141c. It is favorable for the refractive index of the second optical bonding layer 148c to be substantially the same as the refractive indexes of the second base member 141c and the second opposing member 147c. For example, the absolute value of the difference between the refractive index of the second optical bonding layer 148c and the refractive index of the second base member 141c is not more than 1% (more favorably, not more than 0.5%) of the refractive index of the second base member 141c.

For example, a material similar to a transparent plastic such as an acrylic material, a carbonate material, a urethane material, an epoxy material, or the like is used as the second base member 141c. For example, a dielectric multilayer film, a metal film, a metal oxide film, or the like is used as the light reflecting layer 145c. Similarly to the second base member 141c, for example, a material similar to a transparent plastic such as an acrylic material, a carbonate material, a urethane material, an epoxy material, or the like is used as the second opposing member 147c. For example, a transparent optical bonding agent such as an acrylic bonding agent, an epoxy bonding agent, a urethane bonding agent, or the like is used as the second optical bonding layer 148c.

The light reflecting layer 145c is formed along the multiple tilted surfaces 143c. For example, the light reflecting layer 145c is multiple fine half mirrors disposed in parallel.

Although three structures of the second optical unit 140 are illustrated in the description recited above, the structure is not limited thereto.

Figure 5:
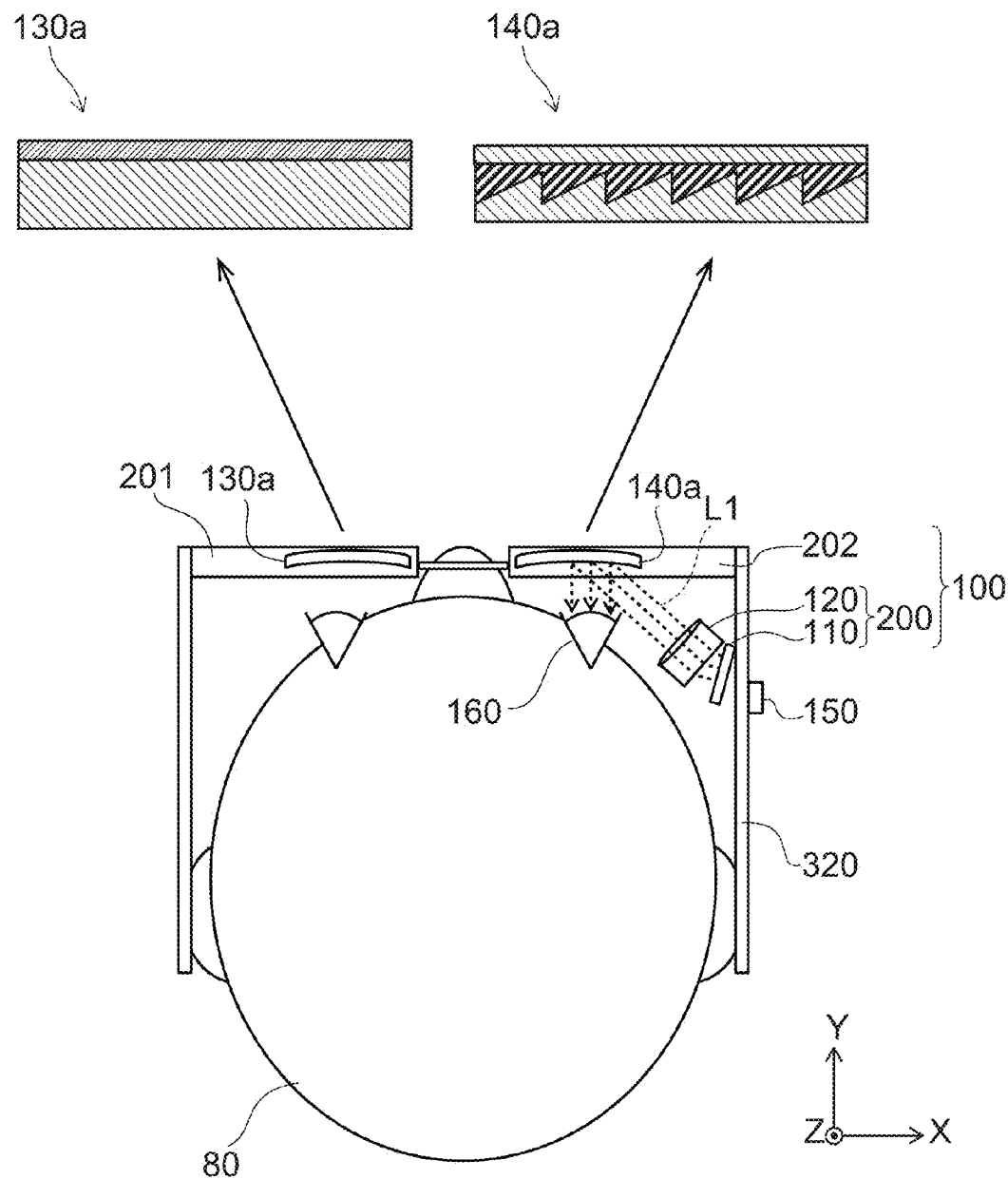
FIG. 5 is a schematic view illustrating the display according to the embodiment.

FIG. 5 is a schematic view illustrating the display according to the embodiment.

In the example, the first optical unit 130a (FIG. 2A) is provided on the non-projection side as a pair with the second optical unit 140a (FIG. 3A) on the projection side. The light reflectance of the first optical unit 130a is lower than the light reflectance of the second optical unit 140a. The light absorptance of the first optical unit 130a is higher than the light absorptance of the second optical unit 140a. Thereby, the light transmittance of the first optical unit 130a and the light transmittance of the second optical unit 140a are set to be substantially the same. For example, the absolute value of the difference between the light transmittance of the first optical unit 130a and the light transmittance of the second optical unit 140a is not more than 1% (more favorably, not more than 0.5%) of the light transmittance of the second optical unit 140a. Thereby, the decrease of the visibility is suppressed; and an easily-viewable display can be provided.

Figure 6:
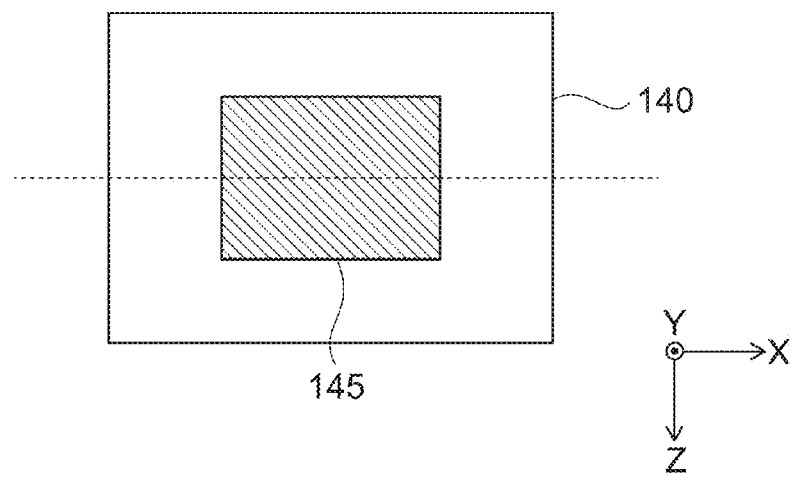
FIG. 6 shows the second optical unit of the display according to the embodiment.

FIG. 6 shows the second optical unit of the display according to the embodiment.

In the second optical unit 140 illustrated in FIG. 6, a light reflecting layer 145 is formed on tilted surfaces 143 and jump surfaces 151 inside a partial region. There are cases where the region where the optical device 120 can project is limited. Therefore, it is favorable for the light reflecting layer 145 not to be formed in the region that the light from the optical device 120 does not reach. Thereby, the foreground 190 is easier to view.

Figure 7:
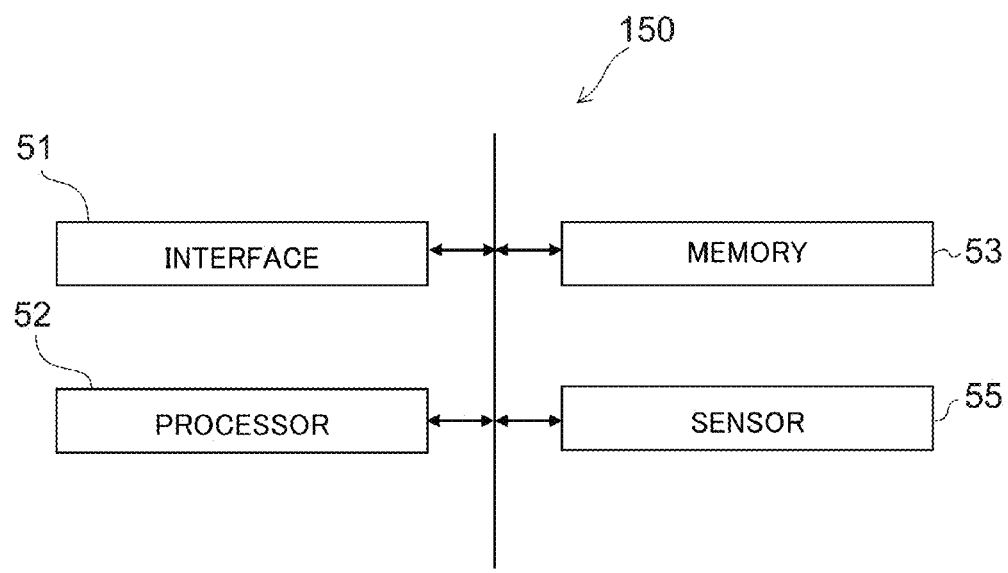
FIG. 7 is a block diagram illustrating the display according to the embodiment.

FIG. 7 is a block diagram illustrating the display according to the embodiment.

The example shown in FIG. 7 is an example of the display according to the embodiment and does not necessarily match the actual module.

FIG. 7 shows the hardware configuration of the processing unit 150 according to the embodiment.

As shown in FIG. 7, the processing unit 150 includes an interface 51, a processor 52, memory 53, and a sensor 55.

The interface 51 acquires the image information by being connected to an external storage medium and/or a network. A wired or wireless method may be used for the external connection. Also, information other than the image information may be communicated. The interface 51 also is connected to the display device 110 by a wired or wireless connection and transmits the image information to be displayed to the display device 110.

For example, a program that processes the acquired image information is stored in the memory 53. For example, the memory 53 stores a program for converting the acquired image information so that an appropriate display is performed by the display device 110. Also, the memory 53 may have a configuration that retains the image information. The program may be provided in the state of being pre-stored in the memory 53, may be provided via a network and/or a storage medium such as CD-ROM, etc., or may be appropriately installed.

The sensor 55 may include, for example, any sensor such as a camera, a microphone, a positional sensor, an acceleration sensor, etc. For example, the processor 52 appropriately modifies the image displayed by the display device 110 based on information obtained from the sensor 55. Thereby, the convenience and ease of viewing of the display can be improved.

An integrated circuit having LSI (Large Scale Integration), etc., or an IC (Integrated Circuit) chipset may be used as a portion of each block or as each entire block in the processing unit 150. Each block may use an individual circuit; or a circuit in which some or all of the blocks are integrated may be used. The blocks may be provided as a single body; or some of the blocks may be provided separately. Also, for each block, a portion of the block may be provided separately. The integration is not limited to LSI; and a dedicated circuit or a general-purpose processor may be used.

According to the embodiments, an easily-viewable display can be provided.

In the specification of the application, "perpendicular" and "parallel" include not only strictly perpendicular and strictly parallel but also, for example, the fluctuation due to manufacturing processes, etc.; and it is sufficient to be substantially perpendicular and substantially parallel.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the embodiments of the invention are not limited to these specific examples. For example, one skilled in the art may similarly practice the invention by appropriately selecting specific configurations of components such as the display device, the optical device, the first optical unit, the second optical unit, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all displays practicable by an appropriate design modification by one skilled in the art based on the displays described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display, comprising:
a projector that emits a first light including image information towards a second optical unit;
a first optical unit that transmits at least a portion of a second light including foreground information;
the second optical unit reflecting at least a portion of the first light and transmitting at least a portion of the second light wherein light transmission of the second light by the first optical unit versus light transmission of the second light by the second optical unit is substantially the same; and
a holder including a first frame and a second frame distinct from the first frame, the first frame holding the first optical unit, the second frame holding the second optical unit,
a light reflectance of the first optical unit being lower than a light reflectance of the second optical unit, and
a light absorptance of the first optical unit being higher than a light absorptance of the second optical unit,
the first optical unit including:
a first base member being light-transmissive;
a light absorption layer stacked with the first base member, and
a light absorptance of the light absorption layer higher than a light absorptance of the first base member,
the second optical unit including:
a second base member being light-transmissive;
a light reflecting layer stacked with the second base member, and
a light reflectance of the light reflecting layer higher than a light reflectance of the second base member,
wherein
the first base member includes an uneven portion having a plurality of tilted surfaces tilted with respect to a major surface of the first base member,
the first optical unit further includes:
a first opposing member; and
a first bonding layer provided between the uneven portion and the first opposing member, the first bonding layer bonding the uneven portion and the first opposing member, and
the first opposing member and the first bonding layer are provided between the light absorption layer and the first base member.

2. A display, comprising:
a projector that emits a first light including image information towards a second optical unit;
a first optical unit that transmits at least a portion of a second light including foreground information;
the second optical unit reflecting at least a portion of the first light and transmitting at least a portion of the second light wherein light transmission of the second light by the first optical unit versus light transmission of the second light by the second optical unit is substantially same; and
a holder including a first frame and a second frame distinct from the first frame, the first frame holding the first optical unit, the second frame holding the second optical unit,
a light reflectance of the first optical unit being lower than a light reflectance of the second optical unit, and
a light absorptance of the first optical unit being higher than a light absorptance of the second optical unit,
the first optical unit including:
a first base member being light-transmissive;
a light absorption layer stacked with the first base member, and
a light absorptance of the light absorption layer higher than a light absorptance of the first base member,
the second optical unit including:
a second base member being light-transmissive;
a light reflecting layer stacked with the second base member, and
a light reflectance of the light reflecting layer higher than a light reflectance of the second base member,
wherein
the first base member includes an uneven portion having a plurality of tilted surfaces tilted with respect to a major surface of the first base member,
the first optical unit further includes:
a first opposing member; and a first bonding layer provided between the uneven portion and the first opposing member, the first bonding layer bonding the uneven portion and the first opposing member, and the light absorption layer is provided between the first base member and the first opposing member.

3. The display according to claim 1, wherein an absolute value of a difference between a refractive index of the first bonding layer and a refractive index of the first base member is not more than 1% of the refractive index of the first base member.

4. The display according to claim 1, wherein
the second base member includes an uneven portion having a plurality of tilted surfaces tilted with respect to a major surface of the second base member,
the second optical unit further includes:
a second opposing member; and
a second bonding layer provided between the uneven portion and the second opposing member, the second bonding layer bonding the uneven portion and the second opposing member, and
the light reflecting layer spreads along the tilted surfaces.

5. The display according to claim 4, wherein an absolute value of a difference between a refractive index of the second bonding layer and a refractive index of the second base member is not more than 1% of the refractive index of the second base member.

6. The display according to claim 1, wherein
the second base member includes an uneven portion having a plurality of tilted surfaces tilted with respect to a major surface of the second base member,
the second optical unit further includes:
a second opposing member;
a liquid layer provided between the uneven portion and the second opposing member; and
an outer circumference bonding unit provided around the liquid layer to bond the second base member and the second opposing member, and
the light reflecting layer spreads along the tilted surfaces.

7. The display according to claim 6, wherein an absolute value of a difference between a refractive index of the liquid layer and a refractive index of the second base member is not more than 1% of the refractive index of the second base member.

8. The display according to claim 1, wherein
the second base member includes an uneven portion having a plurality of tilted surfaces tilted with respect to a major surface of the second base member,
the second optical unit further includes:
a second opposing member including an opposing unevenness unit engaging the uneven portion; and
a second bonding layer provided between the uneven portion and the opposing unevenness unit to bond the uneven portion and the opposing unevenness unit, and
the light reflecting layer is formed along the tilted surfaces.

9. The display according to claim 8, wherein an absolute value of a difference between a refractive index of the second bonding layer and a refractive index of the second base member is not more than 1% of the refractive index of the second base member.

10. The display according to claim 1, wherein a material of the first base member is same as a material of the second base member.

11. The display according to claim 1, wherein an absolute value of a difference between a light transmittance of the first optical unit and a light transmittance of the second optical unit is not more than 1% of the light transmittance of the second optical unit.

12. The display according to claim 1, wherein
a light transmittance of the first base member is lower than a light transmittance of the second base member.

13. The display according to claim 1, wherein the holder holds the projector.

14. The display according to claim 13, wherein the display is mountable to a head of a viewer by the holder, and
the projector is disposed between the head and the holder when mounted.

15. The display according to claim 1, wherein the projector includes a display device and an optical device,
the display device emits the first light,
the optical device being provided between the display device and the second optical unit in an optical path of the first light.

16. The display according to claim 15, further comprising a processing unit connected to the projector,
the display device acquiring the image information from the processing unit.

17. The display according to claim 1, wherein the light absorption layer absorbs at least the portion of the second light, and
the light reflecting layer reflects at least the portion of the first light.

18. The display according to claim 1, wherein a configuration of the display includes one of an eyeglasses configuration and a goggles configuration.

19. A display, comprising:
a projector that emits a first light including image information towards a second optical unit;
a first optical unit that transmits at least a portion of a second light including foreground information;
the second optical unit reflecting at least a portion of the first light and transmitting at least a portion of the second light wherein light transmission of the second light by the first optical unit versus light transmission of the second light by the second optical unit is substantially the same; and
a holder including a first frame and a second frame distinct from the first frame, the first frame holding the first optical unit, the second frame holding the second optical unit,
a light reflectance of the first optical unit being lower than a light reflectance of the second optical unit, and
a light absorptance of the first optical unit being higher than a light absorptance of the second optical unit,
the first optical unit including:
a first base member being light-transmissive;
a light absorption layer stacked with the first base member, and
a light absorptance of the light absorption layer higher than a light absorptance of the first base member,
the second optical unit including:
a second base member being light-transmissive;
a light reflecting layer stacked with the second base member, and
a light reflectance of the light reflecting layer higher than a light reflectance of the second base member,
a material of the light absorption layer being different from a material of the light reflecting layer.

20. The display according to claim 19, wherein
the light absorption layer includes at least one selected from a group consisting of carbon fine particles and an organic dye, and the light reflecting layer includes at least one selected from a group consisting of dielectric multilayer film, a metal film and a metal oxide film.

\* \* \* \* \*